US007129942B2

(12) United States Patent
Martin

(10) Patent No.: US 7,129,942 B2
(45) Date of Patent: Oct. 31, 2006

(54) SYSTEM AND METHOD FOR PERFORMING DOMAIN DECOMPOSITION FOR MULTIRESOLUTION SURFACE ANALYSIS

(75) Inventor: Ioana M. Martin, Pelham Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 10/316,684

(22) Filed: Dec. 10, 2002

(65) Prior Publication Data

US 2004/0108999 A1    Jun. 10, 2004

(51) Int. Cl.
G06T 17/20 (2006.01)
G06T 15/10 (2006.01)
G06T 17/00 (2006.01)

(52) U.S. Cl. .................. 345/423; 345/427; 345/428
(58) Field of Classification Search ........... 345/423, 345/427, 428
See application file for complete search history.

(56) References Cited

U.S. PATENT DOCUMENTS

| 4,797,842 | A | * | 1/1989 | Nackman et al. | 716/20 |
|---|---|---|---|---|---|
| 4,994,989 | A | * | 2/1991 | Usami et al. | 345/420 |
| 5,107,444 | A | * | 4/1992 | Wu | 345/419 |
| 5,142,617 | A | * | 8/1992 | Dalrymple et al. | 345/606 |
| 5,179,638 | A | * | 1/1993 | Dawson et al. | 345/582 |
| 5,218,534 | A | * | 6/1993 | Trousset et al. | 382/132 |
| 5,448,687 | A | * | 9/1995 | Hoogerhyde et al. | 345/423 |
| 5,511,153 | A | * | 4/1996 | Azarbayejani et al. | 345/419 |
| 5,553,206 | A | * | 9/1996 | Meshkat | 345/423 |
| 5,900,880 | A | * | 5/1999 | Cline et al. | 345/423 |
| 5,929,860 | A | * | 7/1999 | Hoppe | 345/419 |
| 6,028,608 | A | * | 2/2000 | Jenkins | 345/619 |
| 6,081,273 | A | * | 6/2000 | Weng et al. | 345/420 |
| 6,226,007 | B1 | * | 5/2001 | Brown | 345/426 |

(Continued)

OTHER PUBLICATIONS

Lee et al. "MAPS: Multiresolution Adaptive Parametrization of Surfaces", ACM, Proceedings of the 25th annual conference on Computer graphics and interactive techniques, pp. 95-104, Jul. 1998.*

(Continued)

*Primary Examiner*—Ulka Chauhan
*Assistant Examiner*—Roberta Prendergast
(74) *Attorney, Agent, or Firm*—Harrington & Smith, LLP

(57) ABSTRACT

A computer-implemented method to process a model of an object includes mapping a mesh representation of the model onto a plane to form a planarized mesh; generating a shape image by associating a shape descriptor with each vertex of the planarized mesh; forming a color image of the planarized mesh by using the shape descriptor to encode a color of each mesh vertex; creating a region map of the color image corresponding to areas of small shape variation; fitting a coarse two dimensional mesh to the region map and computing a target representation from the coarse two dimensional mesh. In the presently preferred embodiment the target representation is expressed as a multiresolution subdivision surface representation. The shape descriptors can include surface normals obtained from the mesh representation and, more generally, can be descriptive of one of surface normal, Gaussian curvature, mean curvature, shape index and curvedness. The colors assigned to the vertices therefore correspond to properties of the three dimensional surface of the object model. Creating the region map includes performing a color segmentation procedure, and in the preferred embodiment identifies clusters of mesh faces corresponding to portions of the mesh in which vertices have approximately the same value of shape descriptor. The process of creating the region map preferably identifies clusters of mesh faces corresponding to connected sets of faces representing aggregate properties of the mesh.

7 Claims, 16 Drawing Sheets

U.S. PATENT DOCUMENTS

| | | | |
|---|---|---|---|
| 6,285,372 B1* | 9/2001 | Cowsar et al. | 345/420 |
| 6,356,263 B1* | 3/2002 | Migdal et al. | 345/423 |
| 6,362,820 B1* | 3/2002 | Hoppe | 345/423 |
| 6,674,433 B1* | 1/2004 | Junkins | 345/423 |
| 6,738,062 B1* | 5/2004 | Moreton | 345/423 |
| 6,831,638 B1* | 12/2004 | Praun et al. | 345/419 |
| 6,943,790 B1* | 9/2005 | Taubin | 345/420 |
| 2002/0143419 A1* | 10/2002 | Praun et al. | 700/98 |

OTHER PUBLICATIONS

Manual of Patent Examining Procedure, 8th edition, section 2114, revision 2. May 2004.*

Svensson et al., "Using grey-level and distance information for medial surface representation of volume images", Proc. of 16th International Conference on Pattern Recognition, 2002, vol. 2, pp. 324-327.*

Sanniti di Baja et al., "Editing 3D binary images using distance transforms", Proc. of 15th International Conference on Pattern Recognition, 2000, vol. 2, pp. 1030-1033.*

Sheffer et al., "Smoothing an overlay grid to minimize linear distortion in texture mapping" ACM Transactions on Graphics, vol. 21, Issue 4, Oct. 2002, pp. 874-890.*

Stam, J., "Exact evaluation of Catmull-Clark subdivision surfaces at arbitrary parameter values", Proceed. of 25th Annual Conf. on Computer Graphics and interactive Techniques, SIGGRAPH '98, ACM Press, New York, NY, pp. 395-404.*

Zigelman et al., "Texture mapping using surface flattening via multidimensional scaling",□□IEEE Transactions on Visualization and Computer Graphics, vol. 8, Issue 2, Apr.-Jun. 2002, pp. 198-207.*

Steiner, D. and Fischer, A., "Cutting 3D freeform objects with genus-n into single boundary surfaces using topological graphs", Proc. of 7th ACM Symposium on Solid Modeling and Applications, Jun. 17-21, 2002, ACM Press, NY, NY, pp. 336-343.*

Gu et al., "Geometry images", Proceedings of 29th Annual Conference on Computer Graphics and interactive techniques, Jul. 23-26, 2002, SIGGRAPH '02, ACM Press, NY, NY, pp. 355-361.*

Maragos, P., "Differential morphology and image processing", IEEE Transactions on Image Processing, vol. 5, Issue 6, Jun. 1996, pp. 922-937.*

Matthias Eck et al., "Multiresolution Analysis of Arbitrary Meshes", Computer Graphics, vol. 29, Annual Conference Series, pp. 173-182, 1995.

Leif P. Kobbelt et al., "A Shrink Wrapping Approach to Remeshing Polygonal Surface", Computer Graphics Forum (Eurographics '99), vol. 18(3), pp. 119-130.

Takashi Kanai, "MeshToss: Converting Subdivision Surfaces from Dense Meshes", Proceedings of Modeling and Visualization 2001, IOS Press, Amsterdam, pp. 325-332, 2001.

Pierre Alliez et al., "Interactive Geometry Remeshing", ACM Transactions on Graphics, Special issue for SIGGRAPH conference, 21(3), pp. 347-354, 2002.

Zoe J. Wood et al.,"Semi-Regular Mesh Extraction from Volumes", IEEE Visualization, pp. 275-282, 2000.

Kai Hormann, "Hierarchical Extraction of Iso-Surfaces with Semi-Regular Meshes", Proceedings of the Seventh ACM Symposium on Solid Modeling and Applications, pp. 53-58, 2002.

Hugues Hoppe et al.,"Piecewise Smooth Surface Reconstruction", Computer Graphics, Proceedings of SIGGRAPH 94, vol. 28, pp. 295-302, Annual Conference Series, 1994.

Hiromasa Suzuki et al., "Subdivision Surface Fitting to a Range of Points", Proceedings IEEE Pacific Graphics 99, pp. 158-167, 1999.

Kai Hormann et al., "MIPS: An Efficient Global Parameterization Method", Vanderbilt University Press, Nashville, pp. 153-162, 2000.

Mathieu Desbrun et al., "Intrinsic Parameterizations of Surface Meshes", In Eurographic conference proceedings, pp. 209-218, 2002.

Alla Sheffer et al., "Seamster: Inconspicuous Low-Distortion Texture Seam Layout", IEEE Visualization, pp. 291-298, 2002.

Xianfeng Gu et al., "Geometry Images", ACM Transactions on Graphics, Special Issue for SIGGRAPH conference, 21(3)355, 2002.

Ch. Brechbuhler et al., "Parameterization of Closed Surfaces for 3-D Shape Description", Computer Vision and Image Understanding, 61(2), pp. 154-170, 1995.

Eli Saber et al., "Fusion of Color and Edge Information for Improved Segmentation and Edge Linking", IEEE Trans. Image Proc., 6(10), pp. 1446-1451, 1995.

U. Labsik et al., "Using Most Isometric Parameterizations for Remeshing Polygonal Surfaces", Proceedings of Geometric Modeling and Processing 2000, (IEEE Computer Society Press) pp. 220-228.

William E. Lorensen et al., "Marching Cubes: A High Resolution 3D Surface Construction Algorithm", Computer Graphics, vol. 21, No. 4, Jul. 1987, pp. 163-169.

Michael Lounsbery et al., "Multiresolution Analysis for Surfaces of Arbitraru Topological Type", ACM Transactions on Graphics, vol. 16, No. 1, Jan. 1997, pp. 34-73.

Kari Pulli et al., "Hierarchical Editing and Rendering of Subdivision Surfaces", Technical Report UW-CSE-97-04-07, Dept. of CS&E, Univ. of Washington, Seattle, WA, 1997, 6 pgs.

Denis Zorin et al., "Interactive Multiresolution Mesh Editing", SIGGRAPH 97 pp. 259-268. Aug. 1997).

Charles Teorell Loop, "Smooth Subdivision Surfaces Based on Triangles", Master's Thesis, Univ. of Utah, Dept. of Mathematics, 1987, 60 pgs.

E.Catmull et al., "Recursively generated B-spline surfaces on arbitrary topological meshes", Computer Graphics Laboratory, New York Institute of Technology, 10(6): pp. 350-355, 1978.

Sheffer, A. et al., "Parameterization of Faceted Surfaces for Meshing using Angle-Based Flattening", Engineering with Computers, 17: pp. 326-337 (2001).

Michael S. Floater et al., "Parametrization and smooth approximation of surface triangulations", Computer Aided Geometric Design, 14: pp. 231-250, 1997.

Henning Biermann et al., "Approximate Boolean Operations on Free-Form Solids", Proceedings of SIGGRAPH 01, pp. 185-194, 2001.

Paul J. Besi et al., "Invariant Surface Characteristics for 3D Object Recognition in Range Images", Computer Vision Graphics, Image Processing, 33, pp. 33-80, 1986.

Jan J. Koenderink et al., "Surface shape and curvature scales", Image and vision computing, 10(8): pp. 557-565, 1992.

Michael M. Chang et al., "Adaptive Bayesian segmentation of color images", Journal of Electronic Imaging, vol. 3, pp. 404-414, 1994.

Douglas, D., et al., Algorithms for the reduction of the number of points required to represent a line or its caricature, The Canadian Cartographer, vol. 10(2), pp. 112-122, 1973.

Stina Svensson et al., "A tool for decomposing 3D discrete objects", IEEE Computer Society Conference on Computer Vision and Pattern Recognition, pp. 950-855, 2001.

* cited by examiner

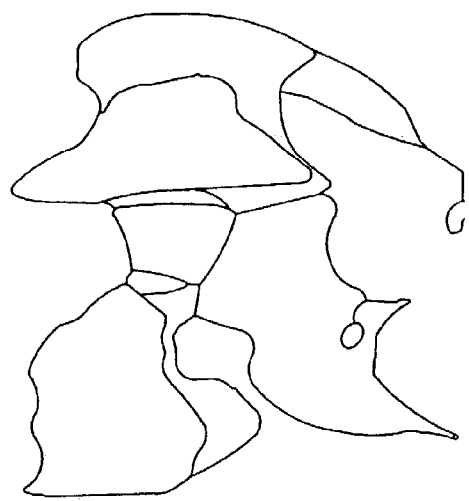 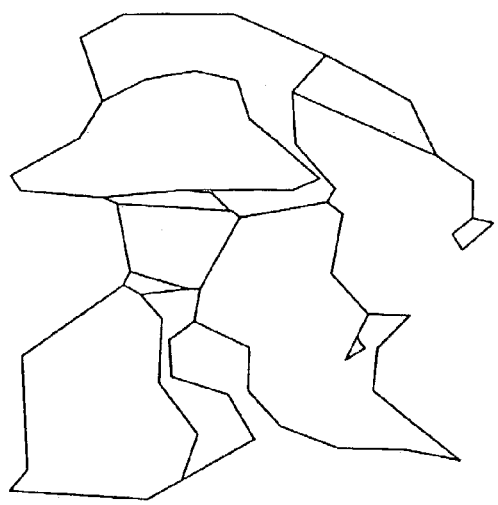
FIG.6A  FIG.6B
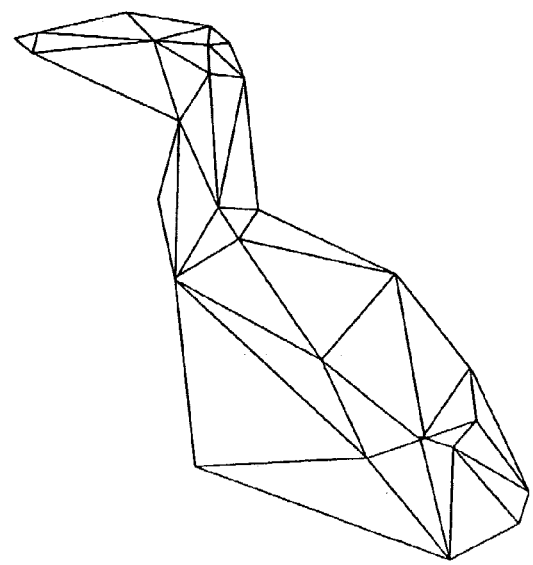
FIG.7

SYSTEM AND METHOD FOR PERFORMING DOMAIN DECOMPOSITION FOR MULTIRESOLUTION SURFACE ANALYSIS

TECHNICAL FIELD

These teachings relate generally to systems and methods for the analysis and display of graphical information, in particular the analysis and display of visual representations of three dimensional (3D) models of objects having shapes rendered with displayable surfaces.

BACKGROUND

The representation of surfaces through subdivision elegantly addresses many of the drawbacks that are inherent in conventional 3D shape representations. Subdivision offers an efficient and compact technique to represent the geometry with minimal connectivity information. The use of subdivision beneficially: (i) generalizes the classical spline patch approach to arbitrary topology; (ii) naturally accommodates multiple levels of detail; and (iii) produces meshes with well-shaped elements arranged in almost regular structures, suitable for digital processing.

One of the earliest approaches to the multiresolution analysis of arbitrary meshes was proposed by M. Eck, T. DeRose, T. Duchamp, H. Hoppe, M. Lounsbery, and W. Stuetzle, Multiresolution Analysis of Arbitrary Meshes, Computer Graphics, vol. 29: Annual Conference Series, pps.173–182, 1995. In this case, domain decomposition is done by randomly selecting seeds on the 3D model around which tiles are grown. The growth of a tile is driven by a set of topological criteria, and does not take into account the shape of the surface.

L. Kobbelt. J. Vorsatz, U. Labsik and H-P. Seidel described in A Shrink Wrapping Approach to Remeshing Polygonal Surface, Computer Graphics Forum (Eurographics'99), vol. 18(3):119–130, The Eurographics Association and Blackwell Publishers, ed. P. Brunet and R. Scopigno, 1999, a shrink-wrapping approach to semi-regular mesh extraction. The approach, however, is limited to closed genus 0 input meshes.

A parameterization-based approach to finding a suitable base domain is described by U. Labsik, K. Hormann, and G. Greiner, Using Most Isometric Parameterizations for Remeshing Polygonal Surfaces, Proceedings of Geometric Modeling and Processing 2000, pps. 220–228 (IEEE Computer Society Press). This method is restricted to manifolds with boundary and no holes, and it is insensitive to shape variations.

T. Kanai in MeshToSS: Converting Subdivision Surfaces from Dense Meshes, Proceedings of Modeling and Visualization 2001, IOS Press, Amsterdam, pps. 325–332, 2001, describes a method to recover a multiresolution Loop subdivision surface. The construction of the base domain is based on simplification of the input mesh which is presumed to be dense. Some surface information such as sharp features are used to guide the simplification process. Nevertheless, like any simplification-based approach, there is limited flexibility as to where vertices of the base domain are positioned and the simplification process may be quite time-consuming. Moreover, no multiresolution hierarchy is directly extracted, rather, different base meshes are used to lead to different approximations.

Of more interest to this invention is the approach of Alliez et al. (P. Alliez, M. Meyer, and M Desbrun, Interactive Geometry Remeshing, ACM Transactions on Graphics. Special issue for SIGGRAPH conference, 21(3):347–354, 2002). In this case, various property maps are computed for a mesh and used for remeshing. The maps, however, correspond to mesh charts with disk topology, and they are not used to compute the decomposition into charts, which is done using the method proposed by M. Eck, et al., Multiresolution Analysis of Arbitrary Meshes, Computer Graphics, vol. 29: Annual Conference Series, pps.173–182, 1995.

Other methods attempt to recover semi-regular meshes from other types of input data. For example, given as input a signed distance volume, the method of Z. Wood, P. Schroder, D. Breen, and M. Desbrun, Semi-regular mesh extraction from volumes, IEEE Visualization, pps. 275–282, 2000, is directed towards the extraction of semi-regular iso-surfaces from volumes. Wood et al. proceed by building a coarse domain for the isosurface by stitching together contours on the surface. This approach is driven by topological information about the model extracted from the volume dataset, and does not include any surface properties in the computation of the base domain. It is also restricted to closed meshes (i.e., meshes with no boundary). Also starting from a volume, K. Hormann, U. Labsik, M. Meister, and G. Greiner, Hierarchical Extraction of Iso-Surfaces with Semi-Regular Meshes, Proceedings of the Seventh ACM Symposium on Solid Modeling and Applications, pps. 53–58, 2002, K. Lee and N. M. Patrikalakis editors (ACM Press), describe a process of semi-regular mesh extraction. The base mesh is computed using a standard Marching Cubes algorithm (W. Lorensen and H. Cline, Marching cubes: A high resolution 3D surface construction algorithm, Proceedings of SIGGRAPH 87, pps. 163–169, 1987), with no regard for surface properties.

A cloud of points is another, relatively common data representation, typically generated by scanning devices. Fitting surfaces to clouds of points has been extensively studied. For example, reference can be made to H. Hoppe, T. DeRose, T. Duchamp, M. Halstead, H. Jin, J. McDonald. J. Schweitzer, and W. Stuetzle, Piecewise Smooth Surface Reconstruction, Computer Graphics, Proceedings of SIGGRAPH 94, vol. 28:295–302, Annual Conference Series, 1994, where the authors describe an optimization-based method for fitting a piecewise smooth surface to a dense set of points. The approach is very compute-intensive as it involves several optimization steps. Also, the recovered mesh is at a single resolution and the method is not applicable to sparse data sets. Mention may also be made of the approach of Suzuki et al. (H. Suzuki, S. Takeuchi, T. Kanai, and F. Kimura, Subdivision Surface Fitting to a Range of Points, Proceedings IEEE Pacific Graphics 99, pps. 158–167, 1999), which recovers meshes with subdivision connectivity. However, this approach requires a manual outlining of the base mesh.

A significant drawback to representing surfaces using semi-regular meshes is having to convert existing 3D data to this format. Current 3D content creation technology typically leads to either irregular representations, such as point clouds and arbitrary polygonal meshes, or to regular but constrained representations, such as spline patches. While volumetric datasets are typically regular in nature, most extraction algorithms tend to yield an irregular mesh from a volumetric dataset.

What is thus required is a technique for the conversion of arbitrary polygonal meshes to multiresolution subdivision hierarchies. While no standard has yet emerged for 3D shape description, polygonal meshes are the output representation of choice in many applications, especially in the final stages of processing for viewing and rendering purposes. Many methods have been devised to generate arbitrary meshes from other representations.

The task of converting an arbitrary mesh to one with semi-regular connectivity can be viewed as having two main steps: (a) identifying a suitable parameterization domain for the input mesh; and (b) resampling the original geometry at regularly-spaced intervals in parameter space.

By far, the first step is the most challenging one. An ideal domain should have several properties. As examples, an ideal domain will have the properties of: a small number of elements; elements that are well-shaped polygons, with reasonable aspect ratios; and that partition the surface of the model into a collection of height-field patches suitable for resampling. Once a parameterization of the model is found, a multiresolution representation can be extracted by choosing the resolution of the finest level, resampling on this level, and then applying multiresolution analysis to generate a hierarchy of details at intermediate levels.

Methods that have attempted to address this problem typically involve some degree of manual adjustment, or they generate arbitrary domains, by simplification of the original mesh.

With specific regard to domain decomposition, it is noted that parameterization of discrete surfaces plays an important role in many computer graphics applications. A commonly used technique to define a parameterization is to identify a coarse polyhedral domain that approximates the surface, and to then define the parameterization as a function over this domain. The first task, domain identification or, alternatively, model decomposition, has numerous applications beyond parameterization generation, in areas such as object recognition, shape perception, collision detection and ray tracing.

To summarize the foregoing, it has been shown that subdivision methods lead to hierarchical representations of 3D surface data that are useful in many applications from network transmission to surface styling and design. A number of algorithms that exploit their semi-regular nature have recently emerged and address some of the major limitations posed by more traditional surface representations, such as arbitrary polygonal meshes and NURBS, in an elegant and efficient way. However, an obstacle to the widespread acceptance of these newer algorithms is the lack of a general, high-quality conversion method from other 3D data formats.

What is thus needed, and what is therefore a goal of this invention to provide, is a method to perform the automatic conversion of arbitrary polygonal meshes into multiresolution hierarchies having subdivision connectivity.

SUMMARY OF THE PREFERRED EMBODIMENTS

The foregoing and other problems are overcome, and other advantages are realized, in accordance with the presently preferred embodiments of these teachings.

Disclosed herein is a process for converting an arbitrary mesh to a semi-regular mesh. The process finds a high-quality parametric domain automatically, without user intervention, taking into account properties of the surface. The process handles input meshes of arbitrary genus. The process also beneficially generates Catmull-Clark and/or Loop multiresolution hierarchies fitted to the input geometry with a minimal amount of distortion.

This invention provides an image-based algorithm for domain decomposition that eliminates the conventional need for manual intervention, that takes into account surface properties, and that accommodates arbitrary 2-manifold meshes. Previous methods have either required some degree of manual input, or have restricted the class of models handled to those of genus 0 (in some cases) or to open meshes with disc topology (in other cases). The image-based algorithm overcomes problems inherent in the geometric approaches of the prior art. An additional benefit of the method is that it provides a technique to compute clusters of faces on a mesh, which is in itself a problem that has conventionally been approached from a geometric point of view.

A computer-implemented method to process a model of an object includes mapping a mesh representation of the model onto a plane to form a planarized mesh; generating a shape image by associating a shape descriptor with each vertex of the planarized mesh; forming a color image (where a color image can be one containing, e.g., red, green, blue (RGB) colors, or one that is a grayscale image) of the planarized mesh by using the shape descriptor to encode a color of each mesh vertex; creating a region map of the image corresponding to areas of small shape variation; fitting a coarse two dimensional mesh to the region map and computing a target representation from the coarse two dimensional mesh. In the presently preferred embodiment the target representation comprises a multiresolution subdivision surface representation.

The mapping process can include parameterizing the input mesh over a plane, or decomposing it into components that can be parameterized onto a plane.

The shape descriptors can include surface normals obtained from the mesh representation and, more generally, can be descriptive of one of surface normal, Gaussian curvature, mean curvature, shape index and curvedness. The colors (or shades of gray) assigned to the vertices therefore correspond to properties of the three dimensional surface of the object model.

Creating the region map includes performing a color segmentation procedure, and in the preferred embodiment identifies clusters of mesh faces corresponding to portions of the mesh in which vertices have approximately the same value of shape descriptor. The process of creating the region map preferably identifies clusters of mesh faces corresponding to connected sets of faces representing aggregate properties of the mesh.

A computer-implemented method to process a three dimensional model of an object may include computing a parameterization p of an input mesh M onto a plane, where P denotes a planarized input mesh and where M represents all or a part of the three dimensional model; constructing a shape map S using P, where S comprises a two dimensional image having colors selected to encode shape information of the three dimensional model; identifying regions of small shape variation in S and building a region graph G; generating a coarse two dimensional polyhedral mesh D2 using G, where D2 comprises facets approximating the identified regions and generating a coarse three dimensional mesh D as the image of D2 through an inverse map $p^{-1}$. The mesh D may be an initial base domain, and a final domain is obtained from D after optimization to adjust positions of its vertices to best fit the input data in a least-squares sense.

Also disclosed is a data processing system for processing a three dimensional model of an object. The data processing system includes a computer operating in accordance with a stored program for mapping a mesh representation of the model onto a plane to form a planarized mesh. The stored program further directs the computer for generating a shape image by associating a shape descriptor with each vertex of the planarized mesh; for forming a color image of the planarized mesh by using the shape descriptor to encode a color of each mesh vertex; for creating a region map of the color image corresponding to areas of small shape variation; for fitting a coarse two dimensional mesh to the region map; for back-projecting the two dimensional map onto the three dimensional model to obtain a three dimensional base domain; for fitting the domain to the geometry of the three dimensional model; and for computing a multiresolution subdivision surface representation of the object with respect to the three dimensional domain. A computer readable media that stores a copy of the program is also encompassed by this invention.

It was noted above that many methods have been devised to generate arbitrary meshes from other representations. By extension, these conventional methods may be combined with the presently preferred embodiment of this invention to generate semi-regular meshes from other types of data.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 6A and 6B show an edge map and a simplified edge map, respectively, for the duck object of FIG. 1;

FIG. 7 illustrates the resulting domain after triangulation of the simplified edge map of FIG. 6B, and back-projection onto the 3D duck model;

FIGS. 8A–8D are useful in explaining a resampling process of this invention, wherein FIG. 8A shows a Venus head model, FIG. 8B depicts a wireframe rendering of the model in FIG. 8A, and illustrates the irregular structure of the mesh, FIG. 8C shows a base domain for the head model and FIG. 8D shows the resampled mesh with semi-regular connectivity;

DETAILED DESCRIPTION OF THE PREFERRED EMBODIMENTS

The terms "2-manifold mesh(s)", "2-manifold(s)" and "two-dimensional manifold(s)" may be used interchangeably in the following description of the preferred embodiments.

For simplicity, the ensuing description is restricted to parametric domains containing polygonal elements of the same type, e.g., triangles or quadrilaterals. This assumption is not, however, to be construed in a limiting sense upon the practice of this invention.

Given a mesh representation of an arbitrary two-dimensional manifold, it is assumed that it is desired to find another, coarse mesh that approximates the same two-dimensional manifold and that serves as a parameterization domain for the two-dimensional manifold. A key question then is how to build the coarse mesh such that it has a small number of faces, where each face corresponds to an area of the input mesh that can be parameterized over the face with minimal distortion.

In contrast to those existing methods that arbitrarily identify a base domain either by simplification of the original mesh, or by finding coarse elements covering roughly equal areas, this invention employs an image-based approach that takes into account properties of the surface when identifying suitable facets for the simplicial base domain. In accordance with an aspect of this invention, the method employs an intermediate mapping of the input model onto a plane. The method then generates a "shape image" by associating a shape descriptor with each vertex of the mesh, and renders the flattened model using the shape descriptor to encode a color of each vertex. The method then identifies or maps regions in the image corresponding to areas of small shape variation. A coarse 2D mesh is fitted to the region map and used to compute a 3D coarse domain as the pre-image of the 2D mesh through the planar parameterization.

A brief description is now provided of the input and output representations for the conversion process.

(A) Arbitrary Polygonal Meshes

Figure 1:
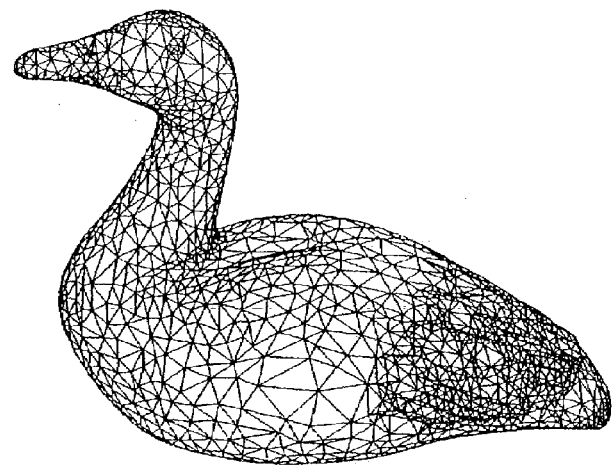
FIG. 1 shows a model of an object, in this case a duck, that is represented by an irregular triangle mesh.

As was previously mentioned, it is desirable to convert irregular polygonal meshes to a more regular, hierarchical representation that is better suited for modeling and network transmission. Irregular meshes are a popular representation used by many applications, and they are also at the basis of hardware implementations. Hence, many other representations are ultimately tesselated to polygonal format for processing or rendering purposes. An irregular polygonal mesh is typically specified in terms of mesh vertices (i.e., locations in space) and mesh faces (i.e., lists of vertices forming a face). Without loss of generalization, consider triangle meshes, i.e., meshes in which each polygonal element is a triangle. Meshes with non-triangular elements may be easily converted to triangle meshes by triangulating each non-triangular face. FIG. 1 shows an example of such a mesh. Note should be taken of the differences between the sizes and shapes of the triangles across the mesh.

(B) Multiresolution Subdivision Surfaces

The presently preferred target representation was introduced in various forms (see M. Lounsbery, T. DeRose, and J. Wareen, Multiresolution analysis for surfaces of arbitrary topological type, Transactions on Graphics, 16(1):34–73, January 1997; K. Pulli and M. Lounsbery, Hierarchical editing and rendering of subdivision surfaces, Technical Report UW-CSE-97-04-07, Dept. of CS&E, University of Washington, Seattle, Wash., 1997; D. Zorin, P. Schroeder, and W. Sweldens, Interactive Multiresolution Mesh Editing, Proceedings of SIGGRAPH 97, pps. 259–268, August 1997). Subdivision defines a smooth surface recursively, as a limit of a sequence of meshes. Each finer mesh is obtained from a coarser mesh by using a set of fixed refinement rules using subdivision rules based on those provided by, for example, Loop (C. Loop, Smooth subdivision surfaces based on triangles, Master's Thesis, University of Utah, Department of Mathematics, 1987) or Catmull-Clark (E. Catmull and J. Clark, Recursively generated B-spline surfaces on arbitrary topological meshes, 10(6):350–355, 1978). Multiresolution surfaces extend these conventional subdivision surfaces by introducing details at each level. Each time a finer mesh is computed, it is obtained by adding detail offsets to the subdivided coarser mesh. If one is given a semi-regular mesh, i.e., a mesh with subdivision connectivity, one can readily convert the semi-regular mesh to a multiresolution surface by defining a smoothing operation to compute vertices for a coarser level from a finer level. The details are computed as differences between the levels.

Figure 2:
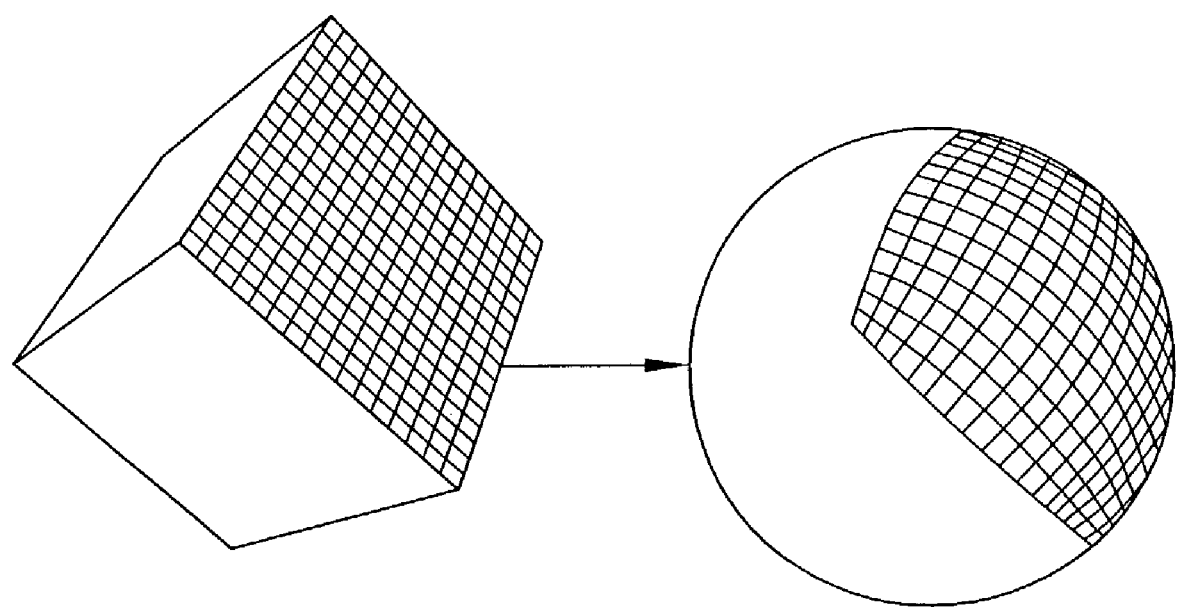
FIG. 2 shows the natural parameterization of a subdivision surface.

For conversion purposes, it is useful to consider a multiresolution surface as a function on a domain. A most natural domain for a multiresolution subdivision surfaces is the initial (coarsest level) mesh, as shown in FIG. 2. FIG. 2 shows the natural parameterization of a subdivision surface, where each time the subdivision rules are applied to compute the finer control mesh, a midpoint subdivision is also applied to a copy of the initial control mesh. As one repeatedly subdivides, one obtains a mapping from a denser and denser subset of the control polygon to the control points of a finer and finer control mesh. In the limit one obtains a map from the control polygon to the surface.

A desirable goal of this invention is to identify a suitable coarse mesh for an arbitrary mesh, and to create a multiresolution subdivision hierarchy on top of the identified coarse mesh.

(C) Planar Parameterizations

The flattening of an arbitrary mesh onto a plane has been an extensively researched subject as it has numerous applications, including texture mapping, remeshing and modeling. Most conventional methods address the problem of flattening manifolds with boundaries (e.g., A. Sheffer and E. de Sturler, Parameterization of faceted surfaces for meshing using angle based flattening, Engineering with Computers, 17(3):326–337, 2001) or, more restrictively, that of flattening meshes with a disc topology (e.g., M.S. Floater, Parameterization and smooth approximation of surface triangulations, Computer Aided Geometric Design, 14:231–250, 1997; K. Hormann and G. Greiner, MIPS: An efficient global parameterization method, pages 153–162, 2000; M. Desbrun, M. Meyer, P. Alliez, Intrinsic parameterizations of surface meshes, In Eurographics conference proceedings, pages 209–218, 2002). However, recent techniques for mesh cutting, such as those described by A. Sheffer and J. Hart in Seamster: Inconspicuous low-distortion texture seam layout, in IEEE Visualization, pages 291–298, 2002 and X. Gu, S. Gortler, and H. Hoppe, Geometry Images, ACM Transactions on Graphics, Special issue for SIGGRAPH conference, 21(3):355, 2002, allow parameterization of 2-manifolds of arbitrary genus onto planes.

Any parameterization method that allows the flattening of a given input 2-manifold onto a plane can be used with this invention. For the purpose of illustration, and not be way of limitation, the presently preferred domain decomposition technique is described in the context of genus zero meshes, with no boundary, using a parameterization in polar coordinates (see C. Brechbuhler, G. Gerig, and O. Kuber, Parameterization of closed surfaces for 3-D shape description, Computer Vision and Image Understanding, 61(2):154–170, 1995). Also described is a presently preferred implementation of the general case of 2-manifolds of arbitrary genus with or without boundaries.

(D) Genus 0 Closed Meshes

In C. Brechbuhler et al. the authors propose a method of parameterizing a genus 0 closed mesh over a sphere by assigning latitude ($\theta$) and longitude ($\phi$) coordinates to each vertex. To obtain a planar parameterization, one unfolds this spherical parameterization into the plane defined by the polar coordinates ($\theta,\phi$) using a cylindrical or some other projection (for example, in cartography there have been many ways devised to unfold a sphere onto a plane for creating a map of the Earth).

(E) Arbitrary 2-Manifolds

General meshes can be flattened by first performing cuts along selected edges to generate a mesh with a disc topology, and then flattening the resulting mesh onto the plane. An example of such a method was described by A. Sheffer and J. Hart in Seamster: Inconspicuous low-distortion texture seam layout, in IEEE Visualization, pages 291–298, 2002.

Alternatively, another approach for dealing with arbitrary meshes is to decompose them into simple parts that can be represented by genus 0 meshes. A coarse base domain can be found for each simple part, and a global domain for the entire object can be computed by merging the base domains of the simple parts (for example, by using boolean operations as described by H. Biermann and D. Kristjansson and D. Zorin, Approximate boolean operations on free-form solids, Proceedings of SIGGRAPH 01, pps. 185–194, 2001.

As will be described in further detail below with respect to FIG. 11, an embodiment of the image-based segmentation process generally proceeds as follows:

Compute a parameterization p of the input mesh M onto a plane. Let P denote the flattened or planarized mesh;

Using P, construct a shape map S, i.e., a 2D image of the model that encodes shape information; Identify regions of small shape variation in S and build a region graph G;

Using G, generate a coarse 2D triangular or quadrilateral mesh D2 with facets approximating the regions found in Step C; and Compute a coarse 3D mesh D as the image of D2 through an inverse map $p^{-1}$.

The mesh D constitutes the initial desired base domain. The final domain is obtained from D, after optimization to adjust the positions of its vertices to best fit the input data (in a least-squares sense).

Steps B, C and D are now described in further detail. These steps correspond to the processing of the mesh in parameter space. The overall operation of the presently preferred methods of this invention are also described in further detail below in relation to FIGS. 9A, 9B and 10–13.

The shape map S serves as a 2D substitute for the input 3D shape. In a manner that is somewhat similar to the geometry maps proposed by P. Alliez, M. Meyer, and M Desbrun, Interactive Geometry Remeshing, ACM Transactions on Graphics. Special issue for SIGGRAPH conference, 21(3):347–354, 2002, and by X. Gu et al., S encodes information about the variation in shape across the input model. A relatively simple manner in which to generate S is to compute a shape descriptor at each vertex of the original mesh M and, through the mapping p, at each vertex of P, and to then render P using a suitable color map that maps shape descriptors to colors. Hardware-assisted rendering can be employed to compute shape maps efficiently.

In that the process is interested in a coarse domain with facets corresponding to relatively flat regions of the input object, the shape descriptors preferably capture the concept of "flatness". Examples of suitable descriptors used in computer graphics and computer vision include, but need not be limited to, surface normals, Gaussian and mean curvatures (P. Besl and R Jain, Invariant surface characteristics for 3-d object recognition in range images, Computer Vision, Graphics, Image Processing, 33:33–80, 1986), shape index as well as curvedness (J. Koenderink and A. van Doorn, Surface shape and curvature scales, Image and vision computing, 10(8):557–565, 1992).

Figure 3:
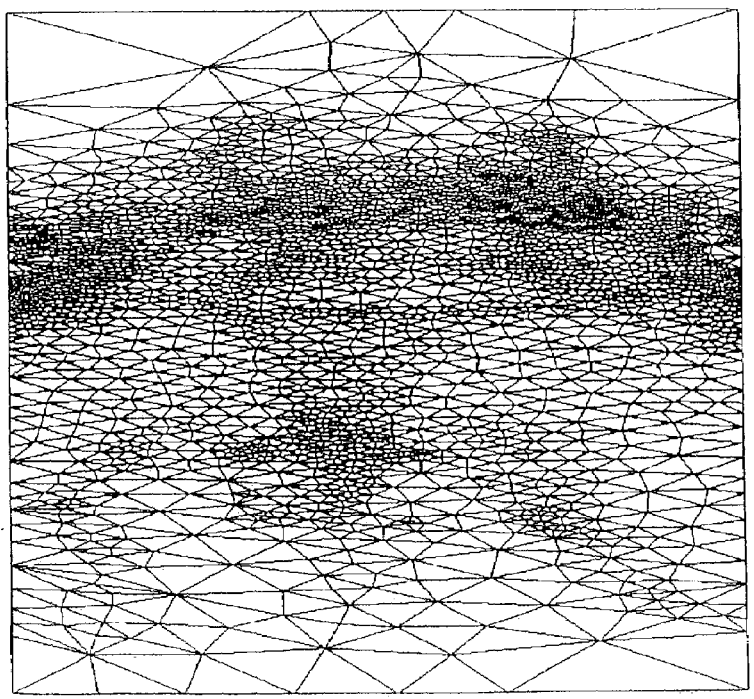
FIG. 3 shows the parameterization of the duck model of FIG. 1 onto a plane.
Figure 4A:
FIG. 4A shows a shape map corresponding to the duck model of FIG. 1, where the shape descriptor at each vertex was defined as the normalized normal at that vertex.
Figure 4B:
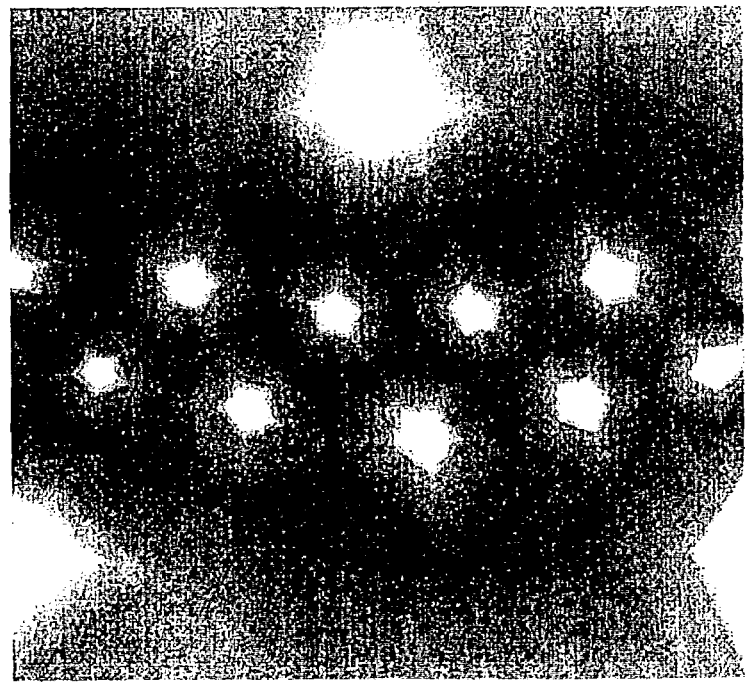
FIG. 4B shows an example of a shape map corresponding to a sphere model, where a Koenderink curvedness parameter was used as a shape descriptor.

FIG. 3 shows the parameterization of the duck model of FIG. 1 onto the plane, while FIG. 4A illustrates (as a gray scale representation of a multi-color image) the shape map obtained by using the normals of the duck model shown in FIG. 1 as shape descriptors. FIG. 4B shows, as a further example, the shape map of a sphere model for which Koenderink's curvedness was used as a shape descriptor.

The shape map encapsulates information about the variation of "shape" across the model into a regular 2D representation. This invention makes use of techniques from color image processing and signal processing to decompose the shape map into regions of interest. Before proceeding to find regions, a small number of smoothing steps are preferably applied to the original shape map to reduce the amount of noise due to discretization. The subsequent processing is then performed on the smoothed shape map.

For the purposes of this invention, the regions of interest preferably correspond to regions of no or little variation in shape. Since the shape variation is encoded into the color information, this task can be cast as a color quantization one.

While, in principle, any color quantization algorithm can be applied at this stage, it is instructive to keep in mind that the quality of the final decomposition depends on the accuracy of the quantization method. Adaptive color segmentation methods, such as those proposed by E. Saber, A. Tekalp, and G. Bozdagi, Fusion of Color and Edge Information for Improved Segmentation and Edge Linking, IEEE Trans. Image Proc., 6(10):1446–1451, 1995 and by M. Chang, M. Sezan and A. M. Tekalp, Adaptive Bayesian segmentation of color images, Journal of Electronic Imaging, vol. 3:404–414, 1994, have been found to provide good results, although this invention is not limited to these articular color segmentation processes. It is also important that colors that appear in the quantized mage should be extracted automatically (as opposed to the user specifying some target number of colors), and that the colors accurately represent the dominant colors in the original image.

Regarding the mapping of shape descriptors to colors, the details of the mapping depend in large part on the descriptor. For example, and for the case of surface normals, the color mapping can be done by mapping each of the normalized (x, y, z) components of a normal vector to the (r, g, b) components of a color. In this way, and by example, a normal of (0, 0, 1) (i.e., a normal along the z axis) gets the color blue. For other shape descriptors, other mappings may be used. For example, and considering the sphere-shaped map in which Koenderink curvedness is used as a descriptor, a function can be applied to map curvedness which is a positive number to the interval [0, 1], and to then associate a gray level to it accordingly (e.g., zero curvedness=black, 1 curvedness=white, in between curvedness is expressed as shades of gray).

It is again noted that an image may be a color image (e.g., a RGB image) or a grayscale image, and for the purposes of this invention a grayscale image is considered to be a special case of a color image. As such, references to color, color mapping and color images made herein should be generally understood to encompass grayscale images as well.

Figure 5A:
FIG. 5A illustrates a smoothed shape map for the duck model of FIG. 1.
Figure 5B:
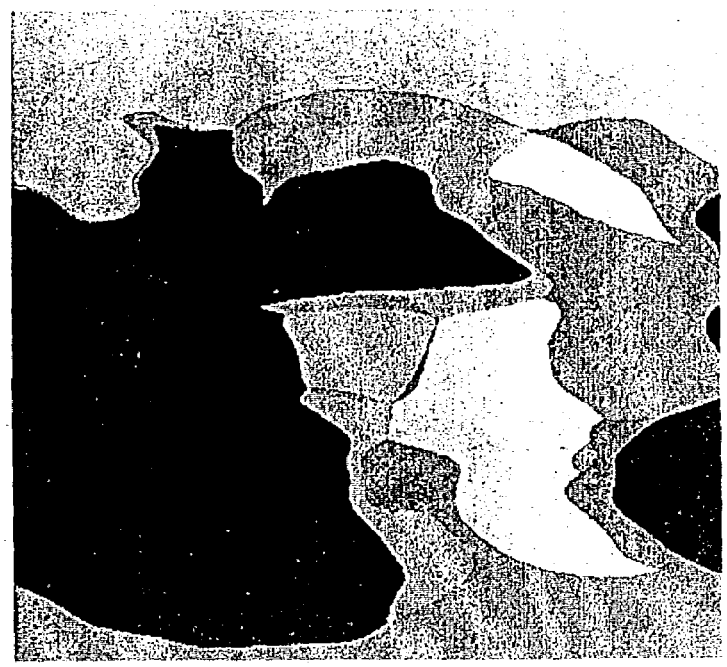
FIG. 5B shows a quantized map containing clusters corresponding to dominant colors.
Figure 5C:
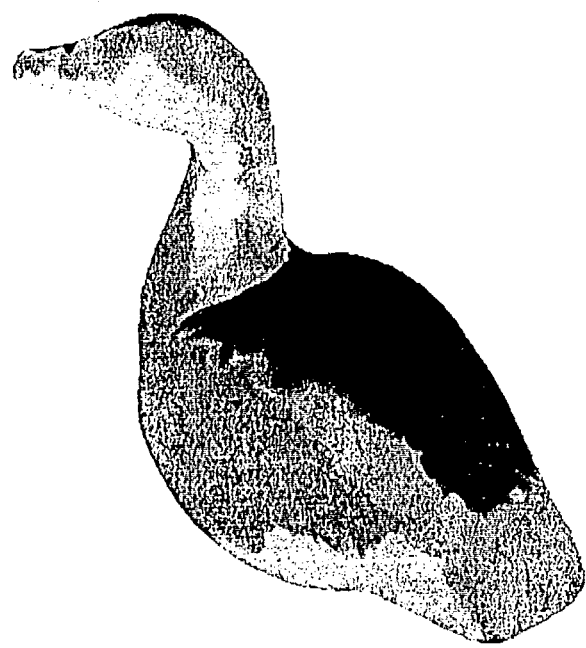
FIG. 5C illustrates clustering based on the quantized map shown in FIG. 5B.
Figure 5D:
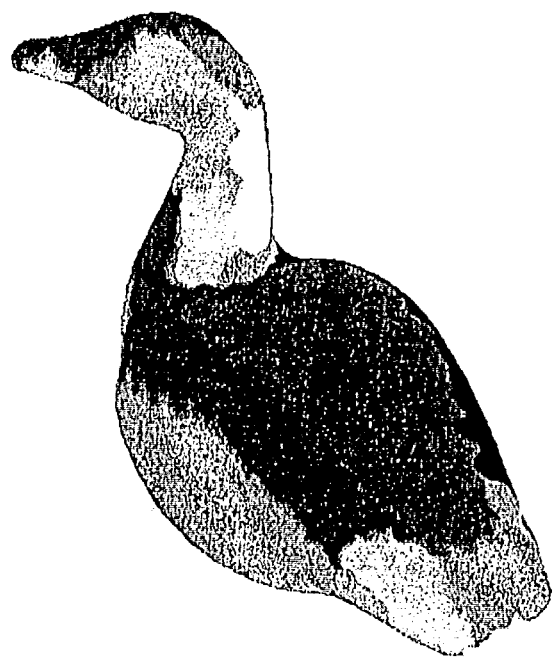
FIG. 5D illustrates refined clusters obtained from a quantized map with an increased number of colors.

FIG. 5B shows a quantized map for the duck model obtained by quantization of the smoothed shape map in FIG. 5A. The corresponding regions on the duck model are illustrated in FIG. 5C. Note that, since the shape map was generated from the surface normals, the resulting regions correspond to portions of the mesh in which vertices have approximately the same normal vectors. This result, in itself, constitutes a novel solution to the problem of finding clusters on meshes. By varying the parameters of the quantization, a hierarchy of clusters can be obtained, as shown in FIG. 5D, for a refined partition obtained by increasing the number of colors in the quantized map. Such clusters are useful in many applications, in which connected sets of faces representing aggregate properties of the mesh are required to be identified. Some exemplary applications where this is the case include ray tracing, collision detection, numerical simulations, and radiosity.

For conversion to a multiresolution mesh with subdivision connectivity, what is desired is a coarse mesh with faces corresponding to the cluster regions as determined above. The method first computes a 2D mesh corresponding to the planar region map, and then maps the vertices of the mesh onto the original surface to obtain a 3D base domain.

In accordance with an aspect of this invention, an algorithm for obtaining an optimal or near optimal triangulation or quadrangulation for a given region map executes the following steps:

(A) Compute a region graph G from the quantized shape map. The nodes of G correspond to regions, and its edges reflect adjacency relationships between region. An edge is inserted between nodes i and j if regions i and j in the quantized map share a common border.

(B) The region graph enables the computation of an edge map E, with edges along the borders of the regions. The use of a graph to locate the edges is preferred over computing the edges directly using an edge detection algorithm, as it is desired to retrieve linked chains along the region boundaries.

(C) To find a suitable triangulation of the region map, it is preferred to first simplify the region map, and then execute a constrained Delaunay triangulation algorithm, in which the simplified edges are the constraints. Alternatively, to find a quadrangulation, one may run a constrained quadrangulation algorithm, or one may convert the triangulation to a quadrangulation.

FIG. 6A shows the edge map computed from the quantized shape map in FIG. 5B, and a simplified edge map is shown in FIG. 6B. In principle, any map simplification algorithm can be used to perform the simplification of the edge map. In the example shown in FIG. 6B the well-known Douglas-Peucker method was employed (see D. Douglas and T. Peucker, Algorithms for the reduction of the number of points required to represent a line or its caricature, The Canadian Cartographer, 10(2):112–122, 1973).

The resulting domain after triangulation of the simplified edge map, and back-projection onto the 3D model, is shown in FIG. 7, which represents the resulting domain for the duck model.

A discussion is now made of a presently preferred resampling process. Once an initial base domain has been found, a multiresolution hierarchy representing the model is generated by resampling followed by multiresolution analysis. These steps are described below in reference to FIGS. 12 and 13.

Figure 15:
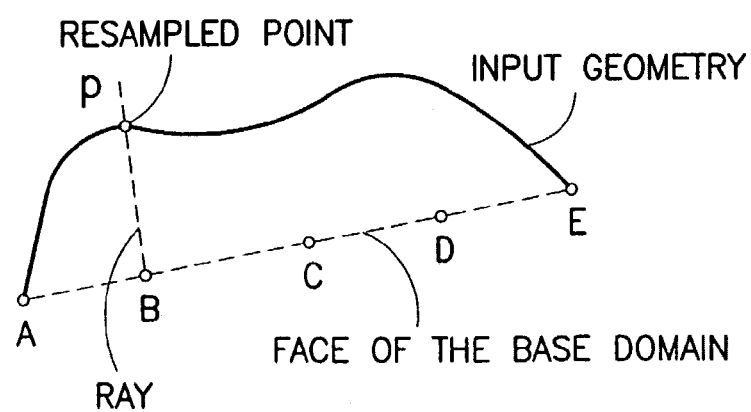
FIG. 15 is a one dimensional diagram that illustrates a presently preferred resampling process.

For resampling, the method first establishes the desired number of levels L for the multiresolution hierarchy, and then generates a dyadic parameterization by midpoint subdivision of each face of the base domain. For example, quadrilateral domains have $(2^{(L-1)}+1) \times (2^{(L-1)}+1)$ points arranged in a regular grid (similar to FIG. 2) on the finest level L−1 (levels are numbered from 0 to L−1). Points on the edges and at the vertices of the base domain are shared. Similarly, for triangular domains, every face is split into four, by inserting vertices at the midpoint of each edge. The original geometry can be resampled on this finest level of the hierarchy by computing the intersections of rays emanating at points on the base domain in the direction of the normal at each point with the original mesh (as illustrated in the one-dimensional diagram in FIG. 15). In FIG. 15, the base domain face is midpoint subdivided. At each grid position the original geometry is resampled by intersecting a ray from the point in the direction of the normal with the original mesh.

Next, a multiresolution hierarchy can be generated from data values on the finest level by selecting a restriction operator. An example of such an operator is the one that replaces every four points on a given level with their average on the next coarser level. Multiresolution analysis with fitting is then applied, from fine to coarse, by solving a least-squares problem on a given level i−1 while fitting the data on the next finest level i. The computed positions on level i−1 are then used to compute values on the next finest level by subdivision. The difference vectors between the original values on level i and the values obtained by subdivision from level i−1, expressed in local coordinate systems at each vertex on level i, constitute the multiresolution details on level i.

Figure 8A:
Figure 8B:
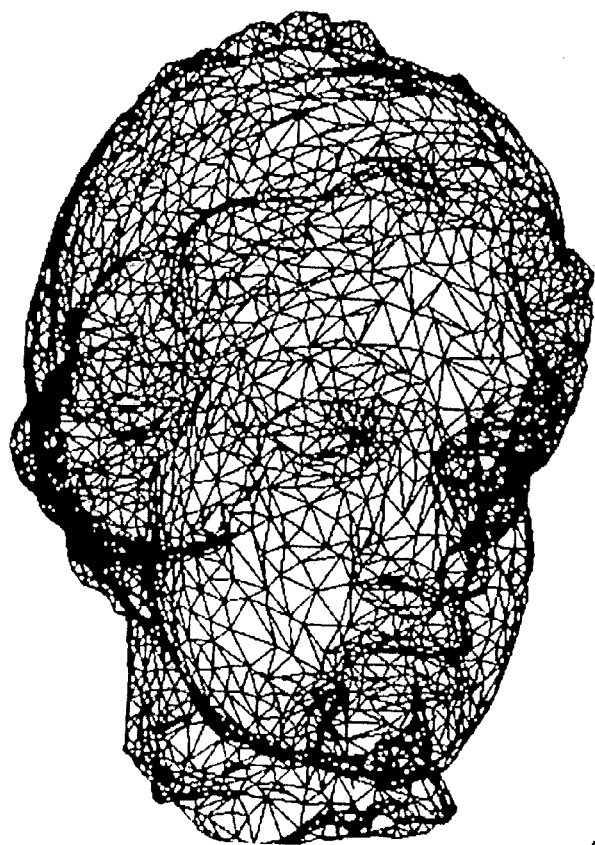
Figure 8D:
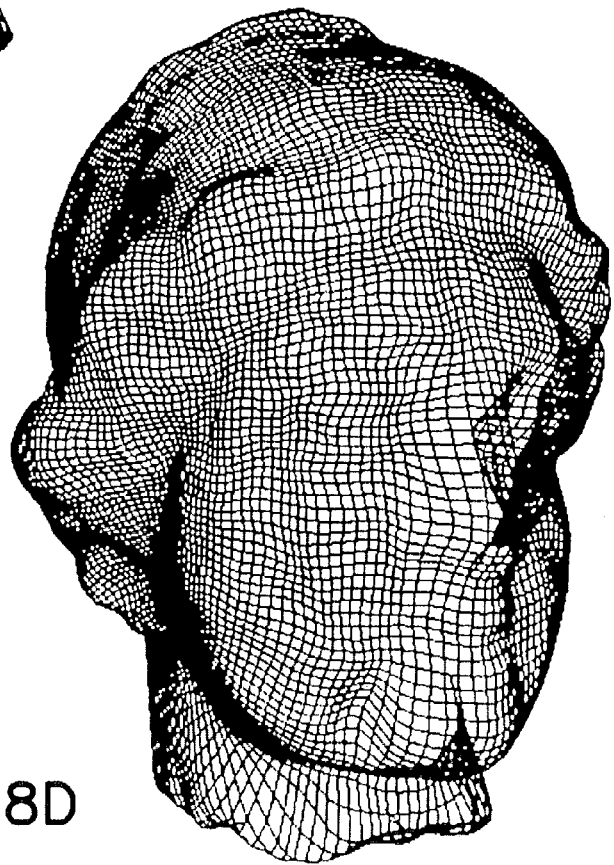
Figure 8C:
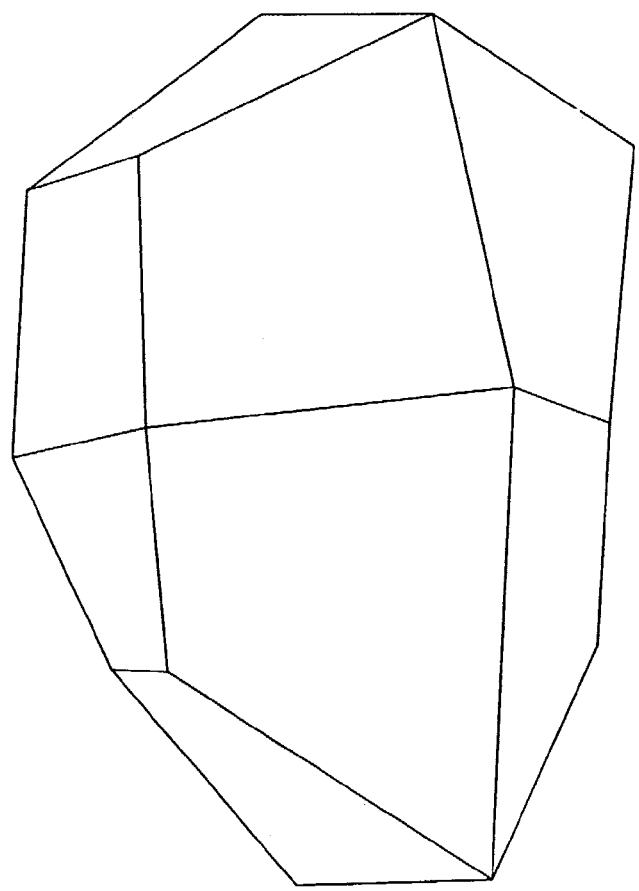

Reference can be made to FIGS. 8A–8D. FIG. 8D illustrates the resulting semi-regular mesh for the Venus head model in FIGS. 8A and 8B, after resampling over the domain shown in FIG. 8C.

Figure 12:
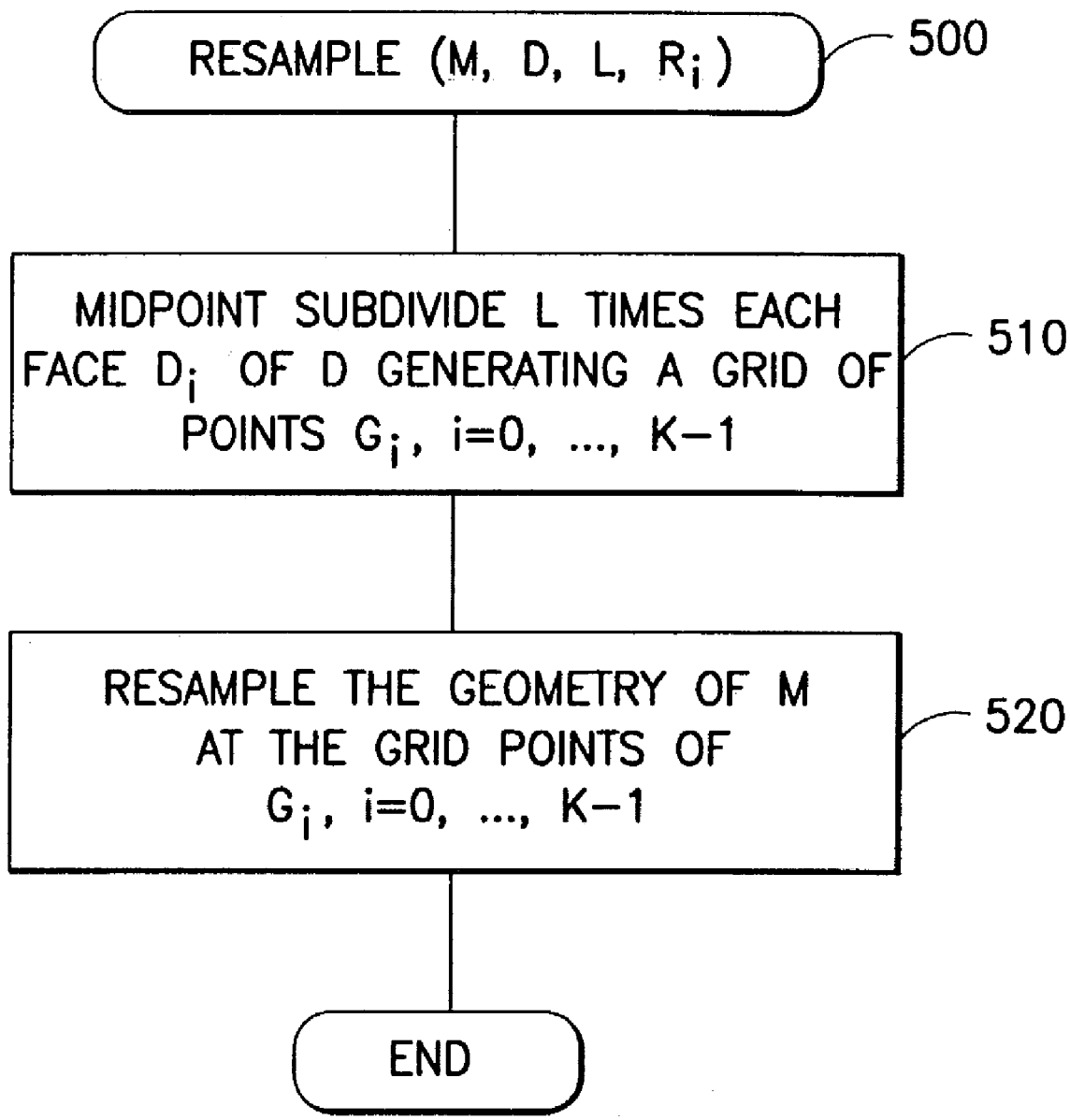
Figure 13:
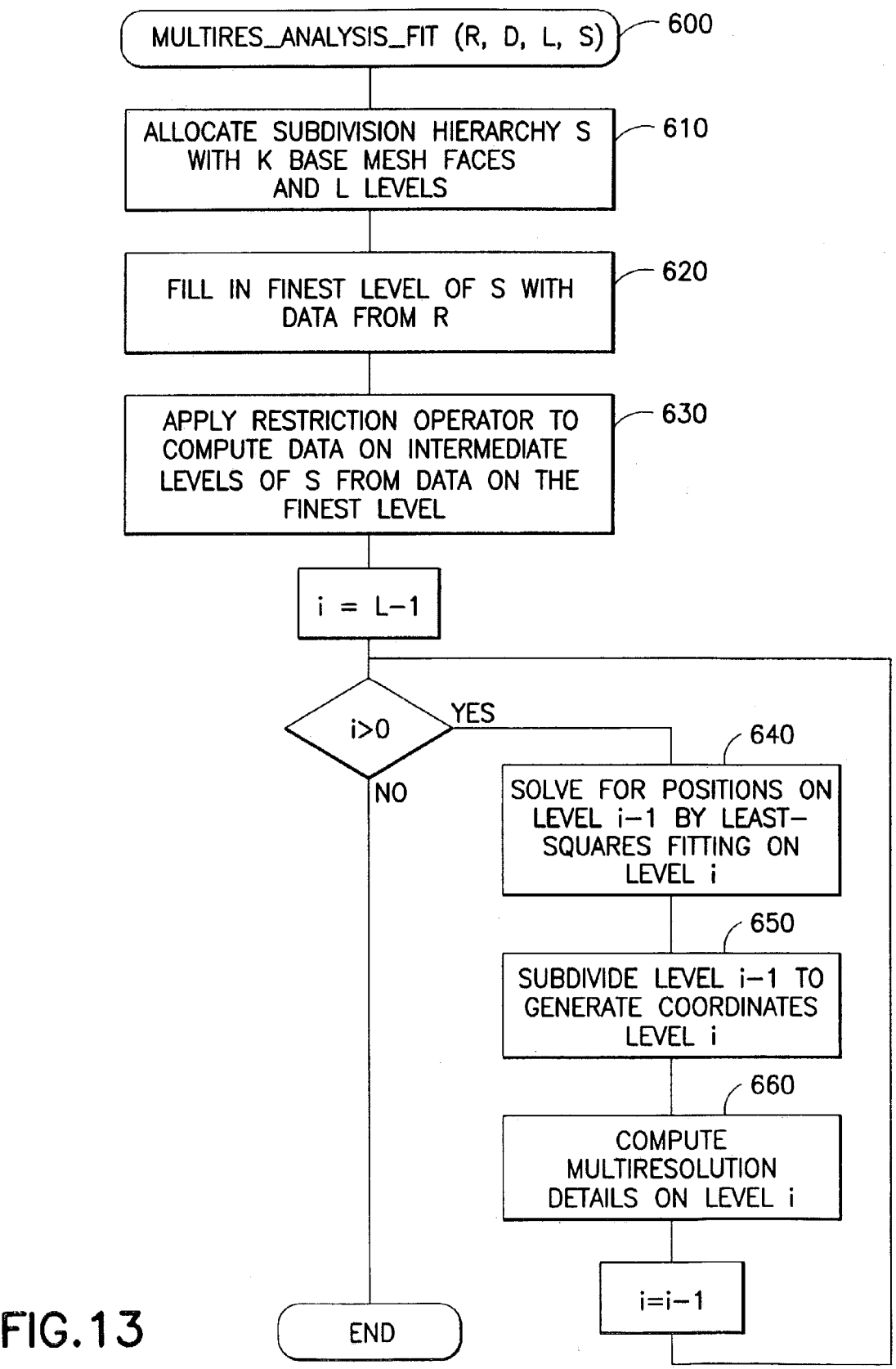
Figure 14:
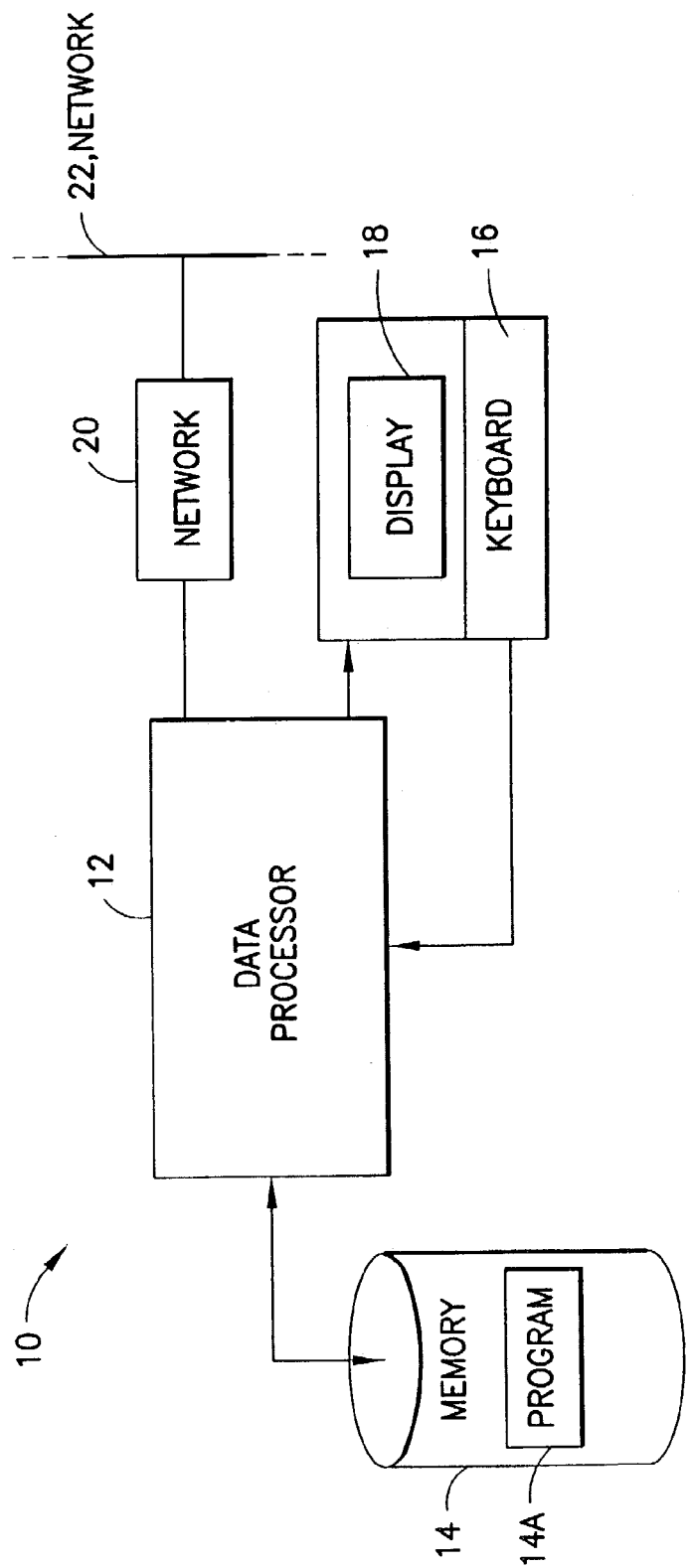
FIG. 14 is a simplified block diagram of a data processing system that is suitable for practicing this invention.

FIGS. 9A, 9B and 10–13 are logic flow diagrams representing algorithms that are executed by the computer system 10 shown in FIG. 14. The system 10 includes at least one data processor 12, a memory 14 and a user interface that typically includes a keyboard 16 and a display 18. A network interface 20 can be provided for coupling the computer system 10 to an external network 22, which may be an intranet such as a local area network (LAN), or it may be or provide access to a global communications network such as the Internet. The memory 14A is assumed to include a program storage portion 14A where computer code is stored for implementing the presently preferred algorithms, as described in FIGS. 8–13. The computer code can be resident on or in any suitable computer-readable media, such as a fixed or removable disk, a tape, or a semiconductor memory To device.

Figure 9A:
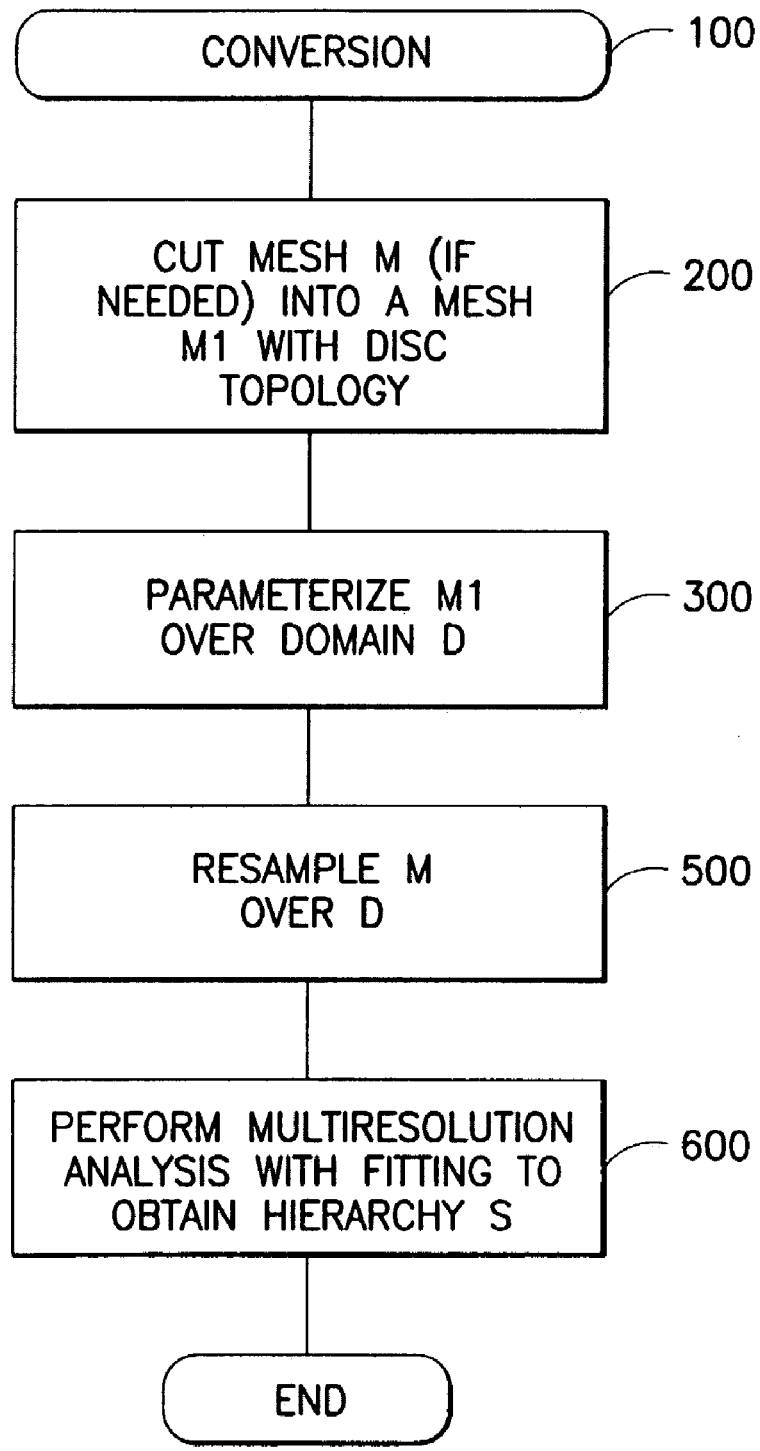
FIGS. 9A, 9B and 10–13 are logic flow diagrams that describe the operation of the methods of this invention in greater detail.
Figure 9B:
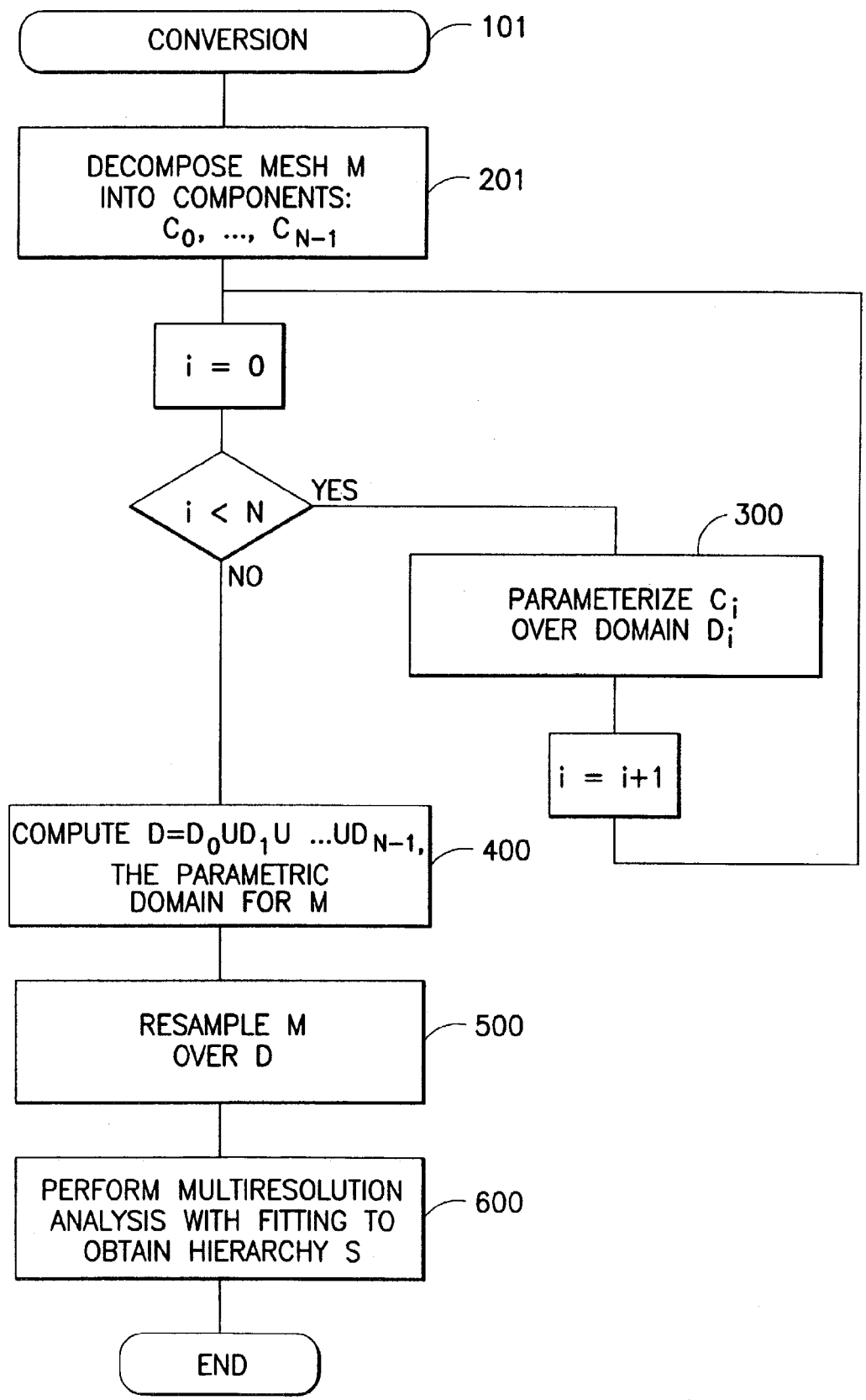

FIGS. 9A and 9B show two primary methods for dealing with a complex model. FIG. 9A shows a case where the model is cut and then flattened, and FIG. 9B shows a case where the model is decomposed into simpler parts, followed by a merging of the independently found domains. Both of these methods are within the scope of this invention.

FIG. 9A shows the main steps of a conversion process 100 in accordance with the first embodiment (model cutting followed by flattening) of this invention. The conversion process takes as input an arbitraiy triangle mesh M with manifold connectivity. At Step 200 the mesh M is cut (if needed), into a mesh M1 with disc topology. At Step 300 M1 is parameterized over the domain D. At Step 500 M is resampled over D, and at Step 600 the method performs multiresolution analysis, with fitting, to obtain the hierarchy S.

FIG. 9B shows the main steps of a conversion process 101 in accordance with the second embodiment (decomposition followed by merging) of this invention. The conversion process takes as input the arbitrary triangle mesh M with manifold connectivity. In Step 201 (shown in greater detail in FIG. 10), components corresponding to sub-parts of the model are extracted. Alternatively, one may employ cutting of the input mesh (as shown in FIG. 9A), and bypass the decomposition into several parts. In this case the following steps are performed as if N=1. For each extracted component, Steps 300 (shown in greater detail in FIG. 11) extract a parameterization domain. The extracted parameterization domains are then merged at Step 400 to obtain a parameterization domain D for the mesh M The merging operation preferably computes D, the parametric domain for M, as the union of domains $D_0$ through $D_{N-1}$ The mesh M is then resampled over the domain D at Step 500 (shown in greater detail in FIG. 12), and a multiresolution analysis Step 600 (shown in greater detail in FIG. 13) is performed to create the multiresolution hierarchy S.

Figure 10:
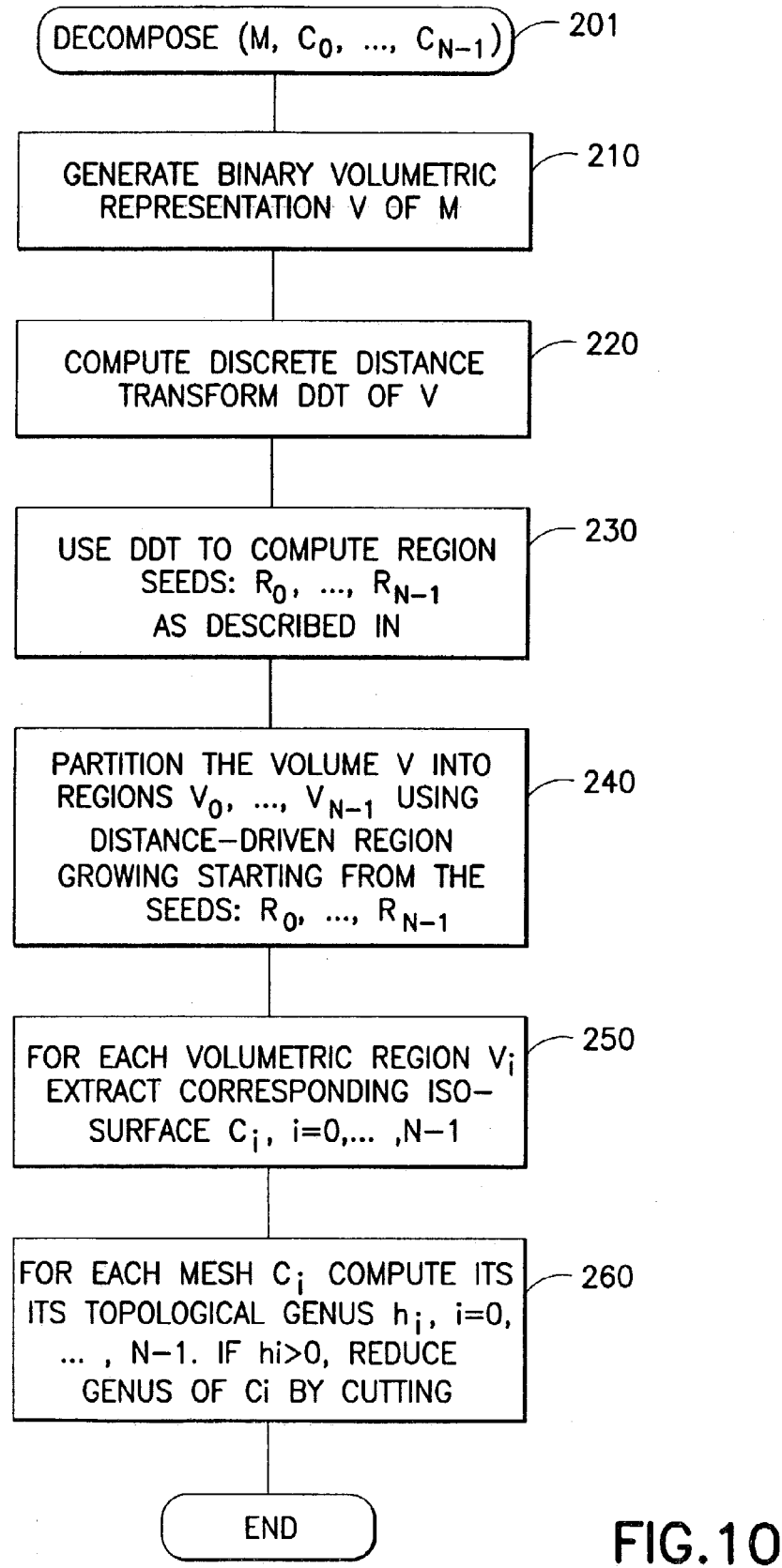

FIG. 10 illustrates in greater detail the process for decomposing the model into simpler parts (Step 201 of FIG. 9B). The general principle of this method step is to extract geometrically and topologically simple sub-meshes that are more readily parameterized than the original mesh. For this purpose different methods may be used. For example, S. Svensson and G. Sanniti di Baja, A Tool for Decomposing 3D Discrete Objects, IEEE Computer Society Conference on Computer Vision and Pattern Recognition, pps. 850–855, 2001 use a volumetric approach model segmentation. This preferred approach is outlined in Step 200. The model is first converted to a binary volumetric representation (V) at Step 210 by enclosing it within a 3D grid, and by labeling all grid points within the model with the label "in", and all points outside of the 3D grid with the label "out". This volumetric representation (V) is used to compute a Discrete Distance Transform (DDT) at Step 220 through which each grid point within the model is labeled with the distance to the surface along grid lines. A volumetric segmentation of the model is performed by computing a set of region seed values $R_0$–$R_{N-1}$ using the DDT corresponding to the regions of the model of differing thickness (Step 230). Starting from the seed values, a distance-driven region growing algorithm is employed to partition the volume within the model into regions corresponding to parts of the model of different thickness (Step 240). For each volumetric region $V_i$(i=0 to N−1), the corresponding iso-surface $C_i$ is extracted, yielding a mesh representation for that region (Step 250). At Step 260 the topological genus of each mesh $C_i$ is computed, and if mesh is not of genus zero, it is converted to a genus zero by cutting. In addition to this preferred implementation of finding parts, other methods that achieve the same result can be used. There exist, for example, medial axis-based methods that allow such decompositions.

Figure 11:
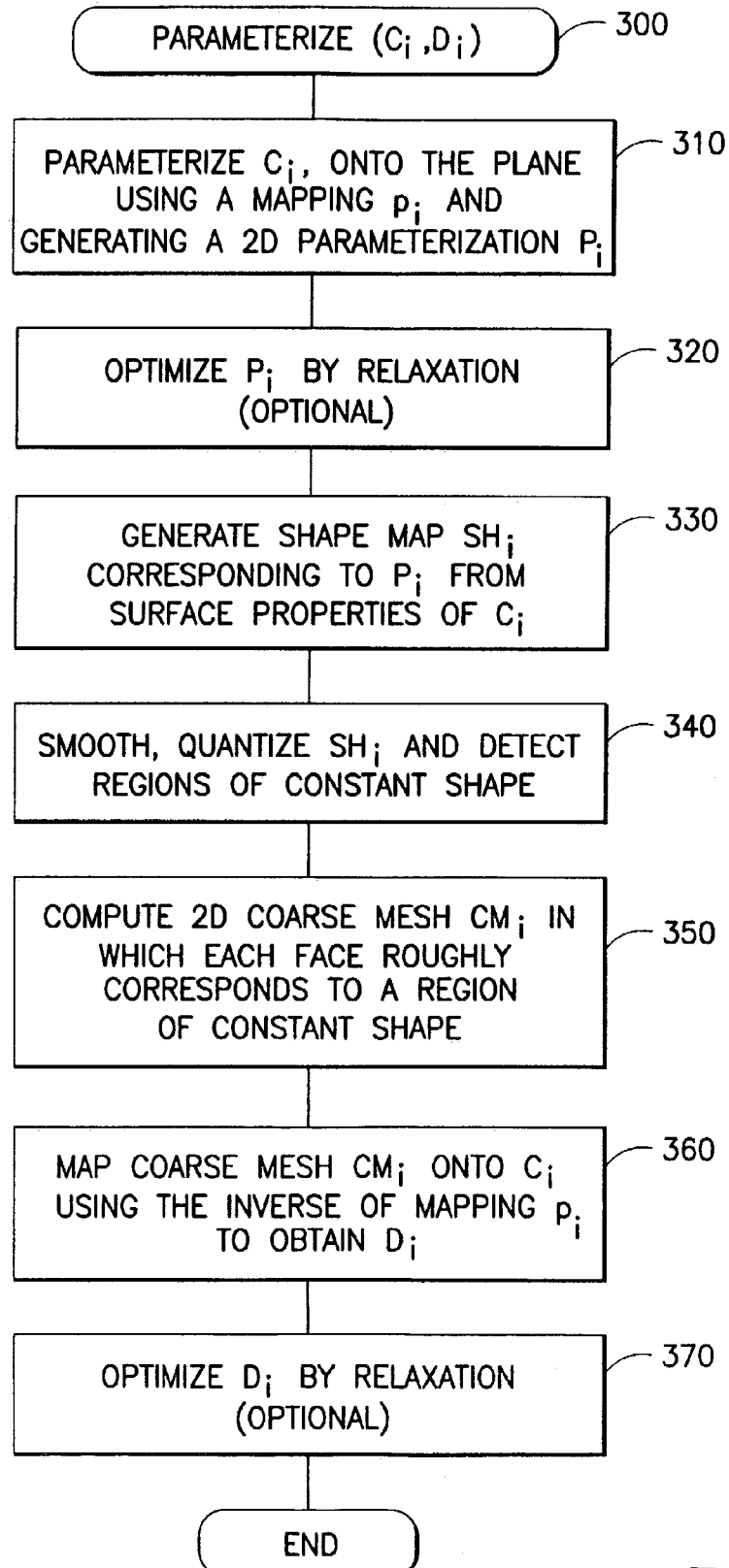

FIG. 11 illustrates in greater detail the process for computing a coarse mesh domain. In this step of the overall method the idea is to parameterize the mesh over a plane. For a non-limiting example of a genus zero mesh, this may be accomplished by first parameterizing the mesh over a sphere by assigning spherical coordinates $(\theta,\phi)$ to each vertex by a diffusion process. Then, using the spherical parameterization, the surface may be flattened into the $(\theta,\phi)$ plane using a cylindrical projection from the sphere to the plane (Step 310), thereby creating a parameterization $P_i$. In other embodiments a mesh cutting technique can be used, such as the one mentioned above by A. Sheffer and J. Hart, Seamster: Inconspicuous low-distortion texture seam layout, IEEE Visualization, pages 291–298, 2002. An optional relaxation process may then be employed to reduce any distortion of the mapping to the plane (Step 320). The projection defines a map between the original surface and a region of the plane, which may then be interpreted as a 2D color image. The colors of the image are computed by assigning colors to the vertices of the projected 2D mesh, and rendering the projected 2D mesh using, preferably, Gouraud shading or some similar technique. The colors assigned to the vertices correspond to the properties of the original 3D surface (e.g., curvatures, normals). The resulting image is referred to herein as the shape map $SH_i$(Step 330). $SH_i$ is then processed to detect regions of constant shape (e.g., by smoothing and color quantization) at Step 340, and at Step 350 a 2D coarse mesh is computed by fitting a 2D quadrilateral (or a triangle) mesh to the region map. In Step 350 each face of the coarse mesh corresponds (approximately) to a region of constant shape of the shape map $SH_i$. The image of the 2D coarse mesh, obtained through the inverse mapping from the plane to the original mesh, gives the coarse parameterization domain $D_i$, for the 2D mesh (Step 360). At Step 370 $D_i$ is optionally relaxed.

FIG. 12 illustrates in greater detail the resampling process 500 shown in FIGS. 9A and 9B. The faces of the base domain are regularly sampled using, preferably, midpoint subdivision (Step 510). More specifically, Step 510 midpoint subdivides L times each face $D_i$ of D, thereby generating a grid of points $G_j$, where i=0, . . . ,K−1. At Step 520 the resampling of the geometry of the triangle mesh M with manifold connectivity is performed at the finest level by computing the positions of the vertices corresponding to the generated grid points $G_j$, i=0, . . . , K−1. This is preferably accomplished by intersecting the original geometry with the normal direction at a given grid point. It should be noted that the normals may be computed by interpolation from the normals of the base domain that, in turn, correspond to the normals interpolated from the original geometry.

FIG. 13 illustrates in greater detail the multiresolution analysis process 600 shown in FIGS. 9A and 9B. More specifically, FIG. 13 depicts the process of generating a multiresolution hierarchy from data on the finest level, and takes as inputs the resampled mesh R, the course mesh D with K faces, and the number of subdivision levels L. The subdivision hierarchy S with K mesh faces, having the number of L levels specified by Step 500 of FIG. 12, is allocated for the resulting mesh at Step 610. At Step 620 the finest level of the hierarch S is assigned values computed in Step 500. The data on intermediate levels is computed by applying a restriction (or smoothing) operator (Step 630). A non-limiting example of a restriction operator is averaging. Steps 640–660 relate to the fitting process. More specifically, for each intermediate level, the positions of the vertices computed by restriction are optimized using a relaxation procedure that includes a least squares fitting of the data at the next resolution level (Step 640). Coordinates of the next level are computed by subdivision (Step 650), and multiresolution details are computed as differences between the original positions and the positions obtained by subdivision (Step 660).

Based on the foregoing detailed description of the methods and apparatus of this invention, it should be appreciated that the inventor has provided an image-based algorithm for domain decomposition that eliminates the conventional need for manual intervention, that takes into account surface properties, and that is capable of accommodating arbitrary 2-manifold meshes. The image-based algorithm overcomes problems inherent in the geometric approaches of the prior art. An additional benefit of the method described above is that it also provides an image-based technique to compute clusters of faces on a mesh.

While described in the context of presently preferred embodiments, those skilled in the art should appreciate that various modifications of and alterations to the foregoing embodiments can be made, and that all such modifications and alterations will still be within the scope of this invention.

What is claimed is:

1. A computer-implemented method to process a three dimensional model of an object, comprising:
   providing a representation of the model as an arbitrary triangle mesh M with manifold connectivity;
   decomposing the arbitrary triangle mesh M into components $C_0, \ldots, C_{N-1}$ by extracting geometrically and topologically simpler sub-meshes that are more readily parameterized than the arbitrary triangle mesh M;
   for each component $C_i$, determining a parameterization domain $D_i$;
   merging determined parameterization domains to obtain a parameterization domain D for the arbitrary triangle mesh M, where D is computed as a union of domains $D_0$ through $D_{N-1}$;
   resampling the arbitrary triangle mesh M over the domain D; and
   performing a multiresolution analysis to create a three dimensional multiresolution hierarchy S, where the decomposing operation comprises:
   converting the model to a binary volumetric representation (V) by enclosing it within a three dimensional grid;
   identifying grid points that lie within the model;
   using the volumetric representation (V) to compute a Discrete Distance Transform (DDT) through which each grid point within the model is labeled with the distance to a surface of the model along grid lines;
   performing a volumetric segmentation of the model by computing a set of region seed values $R_0$–$R_{N-1}$ using the DDT corresponding to the regions of the model of differing thickness;
   starting from the seed values, employing a distance-driven region growing algorithm to partition the volume within the model into regions corresponding to parts of the model of different thickness;
   for each volumetric region $V_i$ (i=0 to N−1), extracting a corresponding iso-surface $C_i$ yielding a mesh representation for that region; and
   computing the topological genus of each mesh $C_i$, and if a particular mesh $C_i$ is not of genus zero, converting the mesh to a genus zero mesh; and displaying the results of the multiresolution analysis.

2. A method as in claim 1, where computing a target three dimensional multiresolution subdivision hierarchy over the three dimensional base mesh comprises resampling using surface normals.

3. A data processing system for processing a three dimensional model of an object, comprising a computer coupled to a memory and comprising logic for operating in accordance with a stored program;
   means for providing a representation of the model as an arbitrary triangle mesh M with manifold connectivity;
   means for decomposing the arbitrary triangle mesh M into components $C_0, \ldots, C_{N-1}$ by extracting geometrically and topologically simpler sub-meshes that are more readily parameterized than the arbitrary triangle mesh M;
   for each component $C_i$, determining a parameterization domain $D_i$;

means for merging determined parameterization domains to obtain a parameterization domain D for the arbitrary triangle mesh M, where D is computed as a union of domains $D_0$ through $D_{N-1}$;

means for resampling the arbitrary triangle mesh M over the domain D; and means for performing a multiresolution analysis to create a three dimensional multiresolution hierarchy S, where the decomposing operation comprises:

means for converting the model to a binary volumetric representation (V) by enclosing it within a three dimensional grid;

for identifying arid points that lie within the model;

means for using the volumetric representation (V) to compute a Discrete Distance Transform (DDT) through which each grid point within the model is labeled with the distance to a surface of the model along grid lines;

means for performing a volumetric segmentation of the model by computing a set of region seed values $R_0$–$R_{N-1}$ using the DDT corresponding to the regions of the model of differing thickness;

means for starting from the seed values, employing a distance-driven region growing algorithm to partition the volume within the model into regions corresponding to parts of the model of different thickness;

means for each volumetric region $V_i$ (i=0 to N–1), extracting a corresponding iso-surface $C_i$ yielding a mesh representation for that region; and means for computing the topological genus of each mesh $C_i$, and if a particular mesh $C_i$ is not of genus zero, converting the mesh to a genus zero mesh.

4. A computer-readable medium encoded with computer program instruction the execution of which by a computer perform operations to process a model of an object, comprising:

providing a representation of the model as an arbitrary triangle mesh M with manifold connectivity;

decomposing the arbitrary triangle mesh M into components $C_0, \ldots, C_{N-1}$ by extracting geometrically and topologically simpler sub-meshes that are more readily parameterized than the arbitrary triangle mesh M;

for each component $C_i$, determining a parameterization domain $D_i$;

merging determined parameterization domains to obtain a parameterization domain D for the arbitrary triangle mesh M, where D is computed as a union of domains $D_0$ through $D_{N-1}$;

resampling the arbitrary triangle mesh M over the domain D; and performing a multiresolution analysis to create a three dimensional multiresolution hierarchy S, where the decomposing operation comprises:

converting the model to a binary volumetric representation (V) by enclosing it within a three dimensional grid;

identifying grid points that lie within the model;

using the volumetric representation (V) to compute a Discrete Distance Transform (DDT) through which each arid point within the model is labeled with the distance to a surface of the model along grid lines;

performing a volumetric segmentation of the model by computing a set of region seed values $R_0$–$R_{N-1}$ using the DDT corresponding to the regions of the model of differing thickness;

starting from the seed values, employing a distance-driven region growing algorithm to partition the volume within the model into regions corresponding to parts of the model of different thickness;

for each volumetric region $V_i$, (i=0 to $_{N-}$1), extracting a corresponding iso-surface $C_i$ yielding a mesh representation for that region; and computing the topological genus of each mesh $C_i$, and if a particular mesh $C_i$ is not of genus zero, converting the mesh to a genus zero mesh.

5. The computer readable medium of claim 4, where the operation of determining the parameterization domain $D_i$ comprises, for a genus zero mesh:

parameterizing the mesh over a sphere by assigning spherical coordinates (θ,φ) to each vertex to provide the spherical quantization;

using the spherical parameterization, flattening the surface into the (θ,φ) plane using a cylindrical projection from the sphere to the plane to create a parameterization $P_i$, where the projection defines a map between an original three dimensional surface and a region of the plane which is interpretable as a two dimensional color image;

computing colors of the image by assigning colors to the vertices of a projected two dimensional mesh, where colors assigned to the vertices correspond to at least one property of the original three dimensional surface, where the resulting image having assigned colors comprises a shape map $SH_i$;

processing $SH_i$ to detect regions of substantially constant shape; and computing a two dimensional coarse mesh by fitting one of a triangle or quadrilateral mesh to the region map, where each face of the coarse mesh corresponds approximately to a region of constant shape of the shape map $SH_i$, and where an image of the two dimensional coarse mesh gives the parameterization domain $D_i$.

6. The computer readable medium of claim 4, where the resampling operation comprises sampling faces of the base domain using a midpoint subdivision operation to generate grid points $G_i$, i=0, . . . ,K–1; where resampling of the geometry of the triangle mesh M with manifold connectivity is performed at a finest level by computing the positions of the vertices corresponding to the generated grid points $G_i$, i=0, . . . ,K–1.

7. The computer readable medium of claim 6, where the multiresolution analysis operation comprises, when generating the multiresolution hierarchy from data on the finest level:

inputting a resampled mesh R, a course mesh D with K faces, and a number of subdivision levels L;

allocating a subdivision hierarchy S with K mesh faces having the number of L level for a resulting mesh;

assigning the finest level of the multiresolution hierarchy S values computed during the resampling operation; and computing data on intermediate levels by applying one of a restriction or a smoothing operator; and for each intermediate level, optimizing positions of the vertices using a relaxation procedure that comprises a least squares fitting of the data at a next resolution level, where coordinates of the next resolution level are computed by subdivision, and multiresolution details are computed as differences between original positions and the positions obtained by subdivision.

* * * * *

UNITED STATES PATENT AND TRADEMARK OFFICE
CERTIFICATE OF CORRECTION

PATENT NO. : 7,129,942 B2 Page 1 of 1
APPLICATION NO. : 10/316684
DATED : October 31, 2006
INVENTOR(S) : Ioana M. Martin It is certified that error appears in the above-identified patent and that said Letters Patent is hereby corrected as shown below:

Claim 3, Column 15, line 13, please delete "arid" and replace with --grid--.

Claim 4, Column 15, line 58, please delete "arid" and replace with --grid--.

Signed and Sealed this

Second Day of January, 2007

JON W. DUDAS
*Director of the United States Patent and Trademark Office*